United States Patent
Permesang

(10) Patent No.: US 8,607,532 B2
(45) Date of Patent: Dec. 17, 2013

(54) BUILDING COMPONENT FOR FORMING A FLOOR OR WALL COVERINGS

(75) Inventor: Claus Permesang, Trier (DE)

(73) Assignee: Petec Société Anonyme, Luxembourg (LU)

( * ) Notice: Subject to any disclaimer, the term of this patent is extended or adjusted under 35 U.S.C. 154(b) by 732 days.

(21) Appl. No.: 10/577,083

(22) PCT Filed: Oct. 20, 2004

(86) PCT No.: PCT/EP2004/011843
§ 371 (c)(1), (2), (4) Date: Dec. 8, 2006

(87) PCT Pub. No.: WO2005/040521
PCT Pub. Date: May 6, 2005

(65) Prior Publication Data
US 2007/0220822 A1    Sep. 27, 2007

(30) Foreign Application Priority Data
Oct. 24, 2003    (DE) .................................. 103 49 790

(51) Int. Cl.
*E04C 2/00* (2006.01)
*E04C 2/34* (2006.01)

(52) U.S. Cl.
USPC ...... 52/796.1; 52/592.1; 52/799.14; 52/783.1

(58) Field of Classification Search
USPC .......... 52/796.1, 799.14, 582.1, 592.1, 592.2, 52/783.1, 794.1
See application file for complete search history.

(56) References Cited

U.S. PATENT DOCUMENTS

| 2,018,711 | A | * | 10/1935 | Elmendorf | .................... 52/396.1 |
| 2,548,036 | A | * | 4/1951 | Milborn | .......................... 165/56 |
| 3,192,567 | A | * | 7/1965 | Abernethy et al. | ........... 425/123 |
| 6,363,677 | B1 | * | 4/2002 | Chen et al. | .................... 52/586.1 |
| 6,490,836 | B1 | | 12/2002 | Moriau et al. | |
| 6,931,811 | B2 | * | 8/2005 | Thiers | .......................... 52/592.1 |
| 7,926,234 | B2 | * | 4/2011 | Pervan et al. | .................... 52/390 |
| 2002/0152707 | A1 | * | 10/2002 | Martensson | .................. 52/592.2 |
| 2003/0024199 | A1 | * | 2/2003 | Pervan et al. | ................. 52/589.1 |
| 2003/0033777 | A1 | * | 2/2003 | Thiers et al. | .................... 52/390 |
| 2003/0154676 | A1 | * | 8/2003 | Schwartz | ........................ 52/391 |

(Continued)

FOREIGN PATENT DOCUMENTS

CH 683 706 4/1994
DE 28 48 303 5/1980

(Continued)

*Primary Examiner* — Jessica Laux
(74) *Attorney, Agent, or Firm* — Lucas & Mercanti, LLP; Klaus P. Stoffel

(57) ABSTRACT

The invention relates to a building component for forming floor and/or wall coverings, for example tile or parquet floorings. According to said invention, the inventive building component comprises a support layer (1) and a layer (2) which is connected thereto and consists of at least one coating element (3) forming a floor or wall surface. Said building component also comprises a device (7, 8) for connecting similar building components applied to a floor or a wall. Said support layer (1) is preferably connected to the coating element (3) by means of an intermediate layer (4) which is foamed or sprayed on the support layer (1) and on the building component.

20 Claims, 11 Drawing Sheets

(56) References Cited

U.S. PATENT DOCUMENTS

Figure 1:
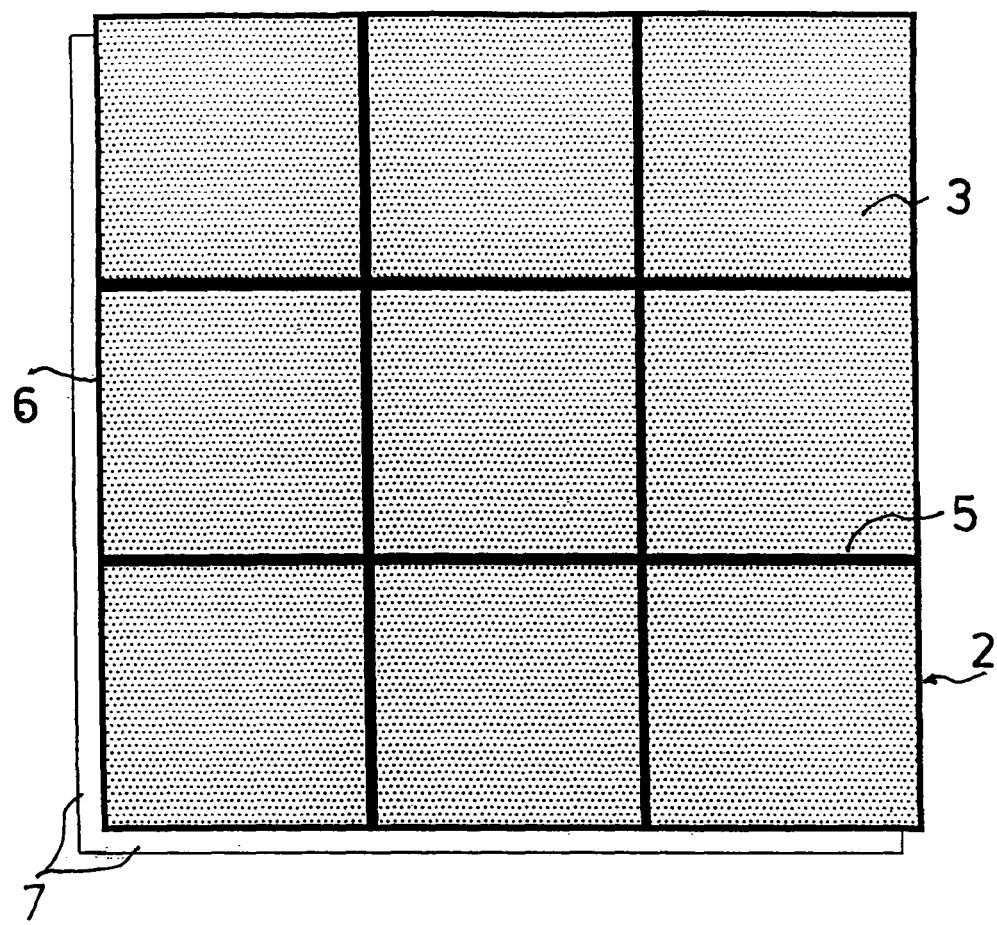

| | | | | |
|---|---|---|---|---|
| 2003/0159385 A1* | 8/2003 | Thiers | | 52/311.1 |
| 2003/0208980 A1* | 11/2003 | Miller et al. | | 52/592.1 |
| 2003/0221387 A1* | 12/2003 | Shah | | 52/592.1 |
| 2003/0233809 A1* | 12/2003 | Pervan | | 52/783.1 |
| 2004/0031225 A1* | 2/2004 | Fowler | | 52/578 |
| 2004/0031226 A1* | 2/2004 | Miller et al. | | 52/588.1 |
| 2004/0074191 A1* | 4/2004 | Garcia | | 52/592.1 |

FOREIGN PATENT DOCUMENTS

| | | | | |
|---|---|---|---|---|
| DE | 39 32 951 | | 4/1991 | |
| DE | 44 09 223 | | 9/1994 | |
| WO | 99/49152 | | 9/1999 | |
| WO | WO03078761 | * | 9/2003 | E04F 15/04 |

* cited by examiner

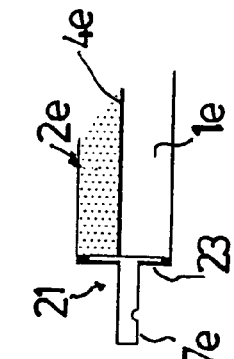
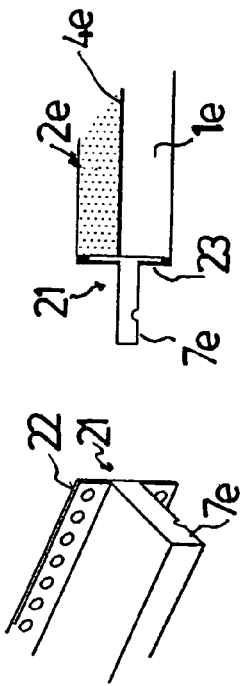
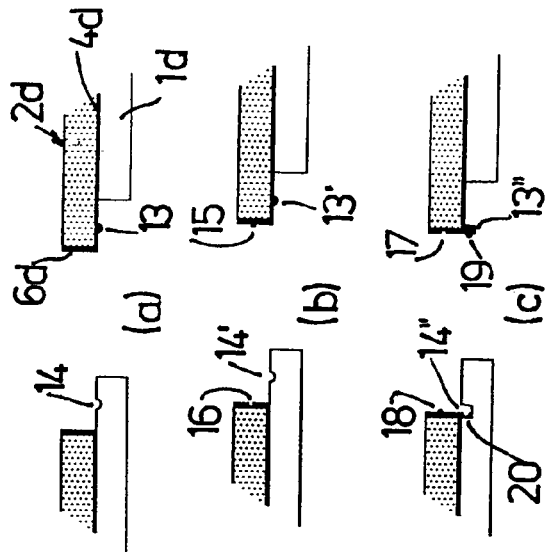
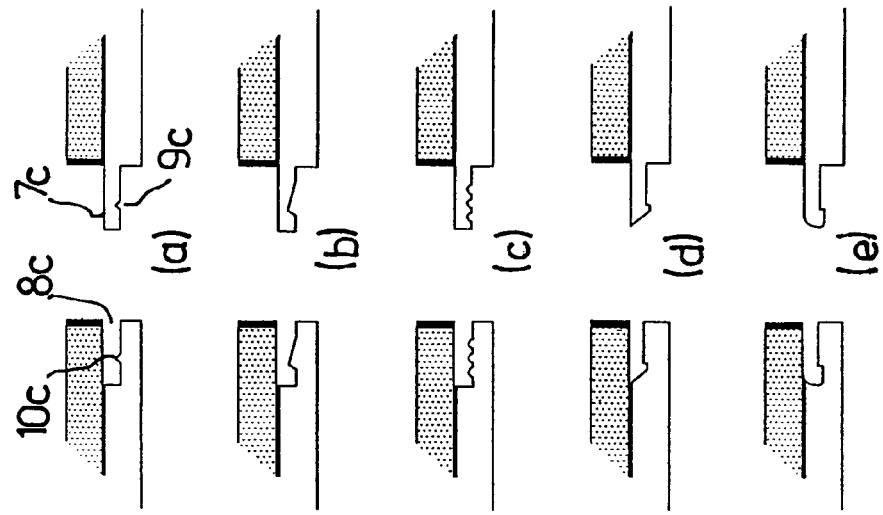
FIG.7
FIG.8
FIG.6

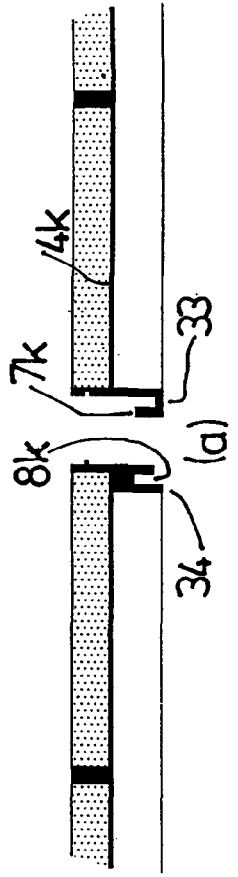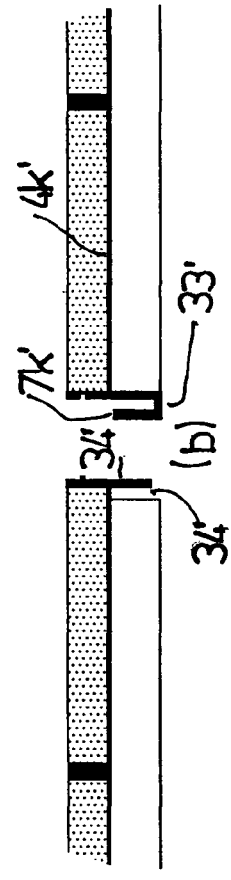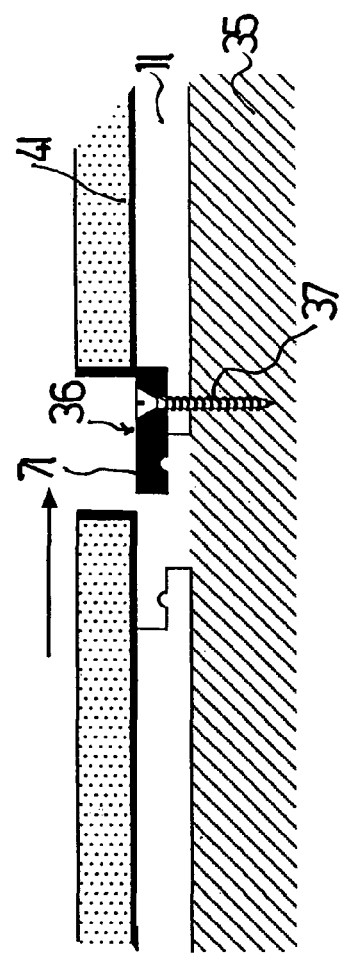# FIG.14
FIG.15
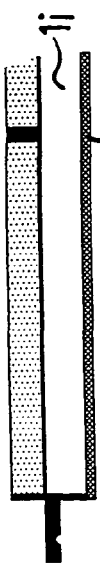
FIG.12
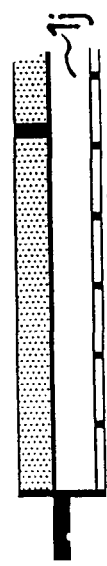
FIG.13

BUILDING COMPONENT FOR FORMING A FLOOR OR WALL COVERINGS

The invention relates to a building component for forming floor and/or wall coverings, for example tile or parquet floorings.

It is known from DE 40 26 472 C2 to produce for example tile floorings by means of applying a support layer to a sub-floor and connecting the support layer with the tiles. In doing so, the support layer exhibits protruding connector elements which engage in corresponding plug-in recesses formed on the underside of the tiles.

The present invention has the object to further simplify the production of wall and floor coverings relative to this state of the art.

This object is met by means of a prefabricated building component that comprises a support layer and a layer which is connected to the support layer and forms a floor or wall surface out of at least one coating element, as well as devices for connecting similar building components applied to a floor or wall.

By means of such building components which preferably can be fit into each other it is possible to produce a tile or parquet flooring with little effort and within a short amount of time. Similarly the floor can also be easily removed again and reused at a different location. Consequently, exhibition spaces at trade fairs or in showrooms are especially suitable application areas. There are also application possibilities in living and workspaces, where the building component especially lends itself for renovations.

The underside of the support layer can exhibit a profile and/or a material with a high coefficient of static friction which prevents a slipping on the sub-floor, so that the floor covering is even fit for traffic and suited for use, for example, in showrooms for vehicles.

The side of the support layer facing the sub-floor can further be made of a soft, ductile layer which enables an adjustment to uneven sub-floors. The quality requirements for the sub-floor can thus be accordingly low and a layer of floor pavement where required unnecessary.

Firm, stable support layers can be made of recycling material, especially plastic recycling material at a low cost. However, other materials may also be used for this purpose such as chipboard, sandwich type plaster board or slab foam.

Ceramic, stoneware, natural stone, glass, plastic, metal and/or wood are suited as material for the coating element. In particular, the coating element may comprise a parquet wood piece or parquet laminate element.

While a direct connection between the support layer and the layer exhibiting coating elements is possible, a preferred embodiment of the invention entails a connection by means of an intermediate layer. The intermediate layer can be foamed or sprayed on the support layer and the at least one coating element. The later embodiment can be produced cost-effectively by using a tool, in which the coating elements and the support layer are positioned at a distance relative to each other in the molding cavity of the tool and the foaming material is inserted or the plastic injected.

The intermediate layer is preferably foamed or sprayed by filling the joints between the coating elements. In addition, a spraying or foaming can be carried out while simultaneously forming a bordering encircling the building component, wherein the bordering is for example half as wide as the joint width.

The intermediate layer is preferably made of an elastic and/or water-resistant material. Joint fillings made of this material advantageously seal the edge surfaces of the coating elements. For example wood coating elements whose exposed surface is sufficiently sealed are protected from water absorption and maceration.

It is advantageous in the previously illustrated embodiment that a high quality material is only needed for the intermediate layer, while the support layer can be made for example of inexpensive recycling material.

In addition, the devices for connecting the building components, preferably connector devices, can also be made during the spraying or foaming of the intermediate layer and are accordingly molded to the intermediate layer in one piece.

Alternatively, there is the possibility to place parts which form separate connection devices along into the tool's molding cavity and to also spray or foam on these parts when forming the intermediate layer.

While tenons and mortises are conceivable as connector devices, the preferred embodiment is designed to have tongue-and-groove joints, wherein the grooves and tongues can be arranged on the building component such that the building components can be connected together either parallel or perpendicularly to the plane of the support surface. The grooves and tongues can each extend over the entire length or only a section of the building component's edge.

Preferably an engaging plug-in connection is provided, wherein for example a snap-in web engages in a corresponding snap-in recess in the groove. The snap-in web can extend over the entire length or only a section of the length of the tongue.

The building component preferably comprises a groove at two edges which are perpendicular relative to each other and a tongue at the edges opposing these edges. With such a groove and tongue arrangement floors or wall coverings can be made of identically designed building components.

The groove can be formed between the support layer and the layer exhibiting the coating elements out of at least one coating element.

The edges of the support layer and of the layer are preferably offset in the direction of the plate plane relative to each other, so that the layer edge of an element rests on the support layer edge of the neighboring building component or vice versa at a juncture. In this embodiment a connection tongue advantageously does not alone remove loads acting on the floor at the junctures.

As a device for connecting the building components, an element having the tongue or the groove can be connected in one piece to the intermediate layer.

In a further embodiment of the invention it is possible to embed pipes for heating or cooling, heat conductors and/or sensors into the building component, wherein for example sensors can detect whether the floor surface is being walked on or not, or a switching process can be triggered, for example for activating a light or an alarm system. The intermediate layer is also suited for embedding such components.

In a further embodiment of the invention the building component can be part of a building system that further encompasses for example flexible, in particular bendable similar building components, wherein for example such a building component connected with an elastic joint piece is suited for application at the transition between a floor and a wall or over a floor edge, for example at the beginning or end of a ramp.

The building system can encompass elastic joint connection elements which make it possible to connect the building components elastically with each other. In addition, the system can contain edge covers, which for example are designed in the shape of a ramp, so that for example a transition can be created from a floor surface made up of the building components to a lower floor surface. The edge covers may also have lighting devices.

The material which fills the joints between the coating elements can be colored, for example for adapting to the coating elements. In addition, it could have an afterglow or exhibit a surface profile.

Figure 2:
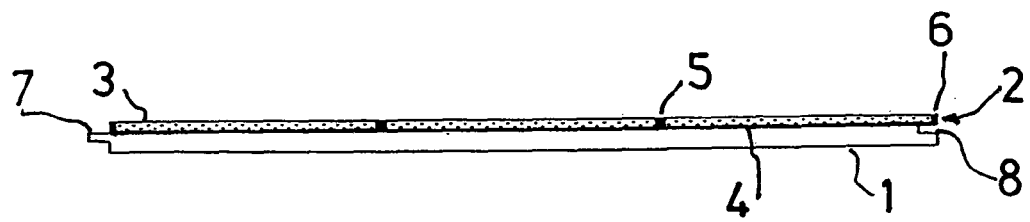
Figure 3:
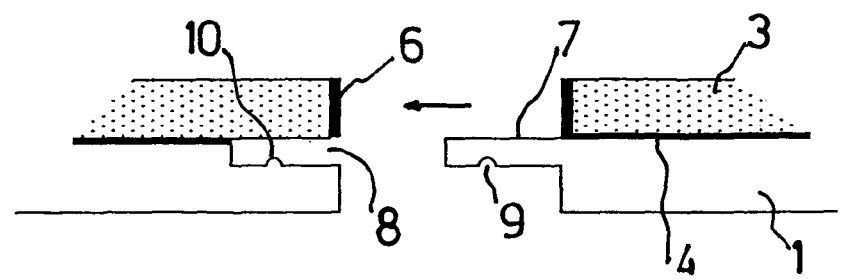
Figure 4:
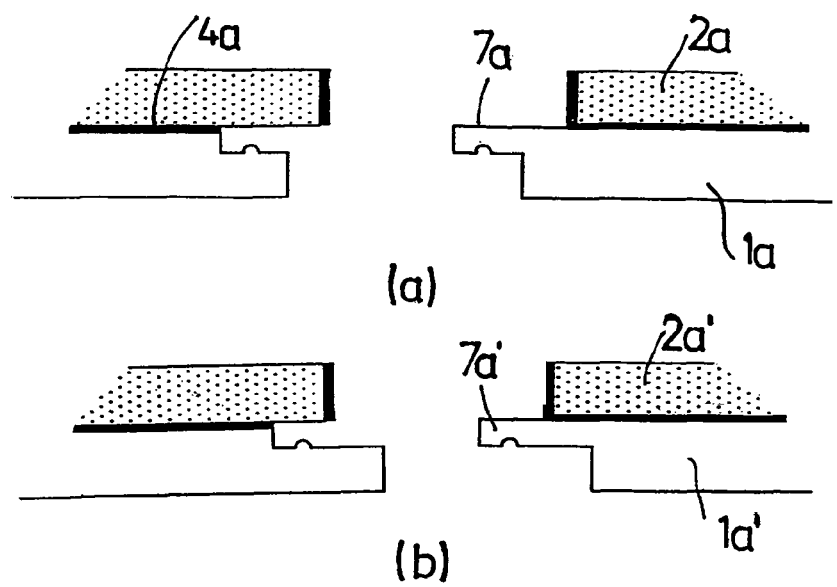
Figure 9:
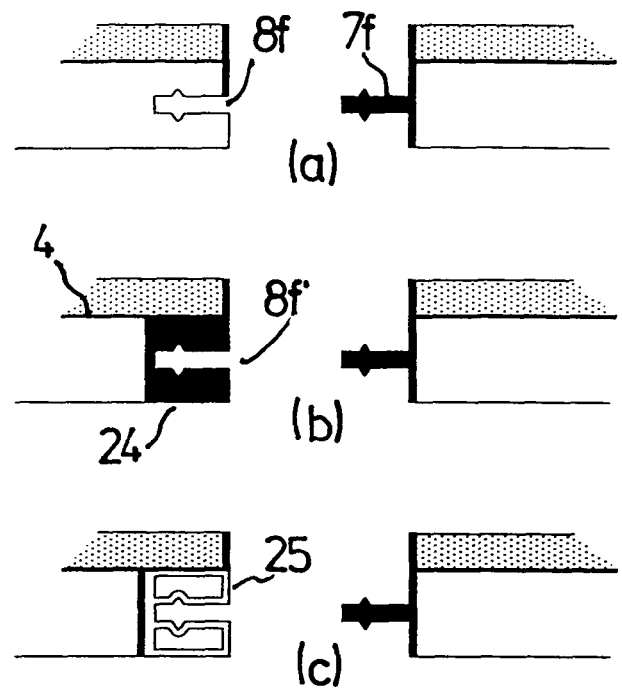
Figure 10:
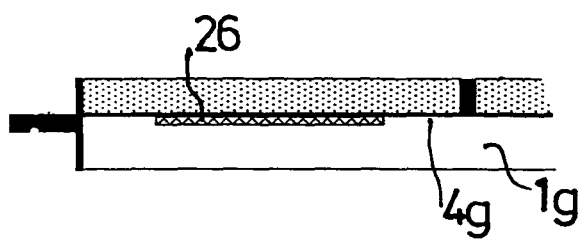
Figure 11:
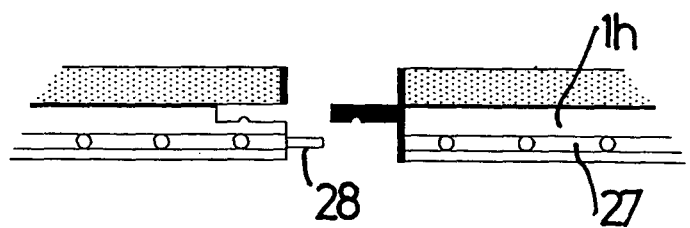
Figure 16:
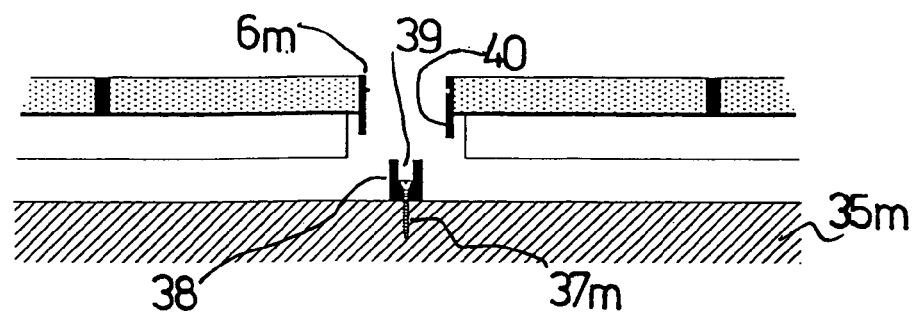
Figure 17:
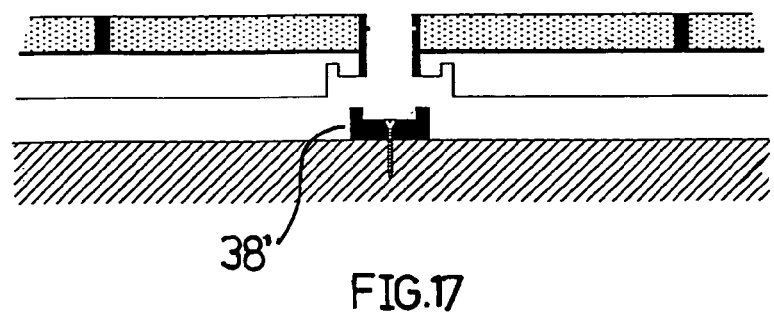
Figure 18:
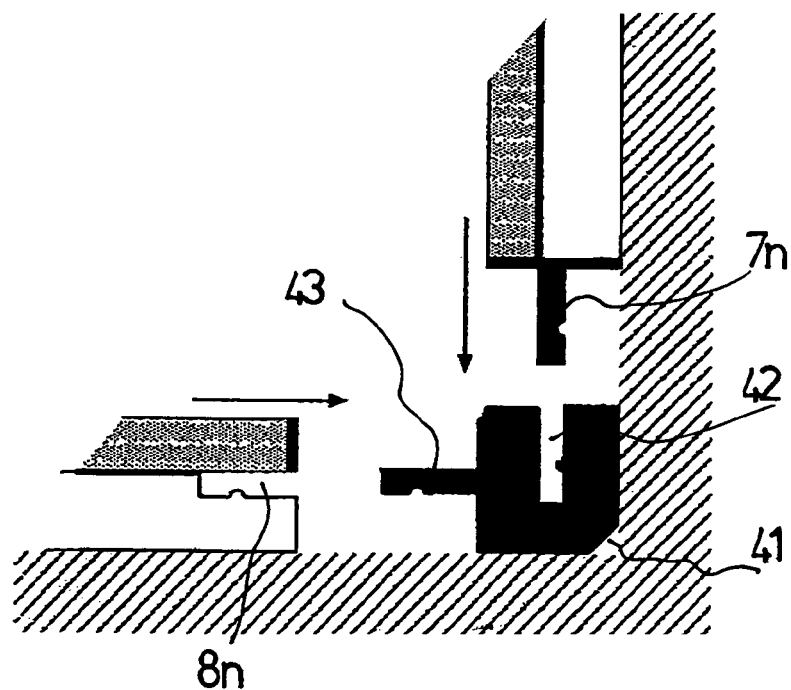
Figure 19:
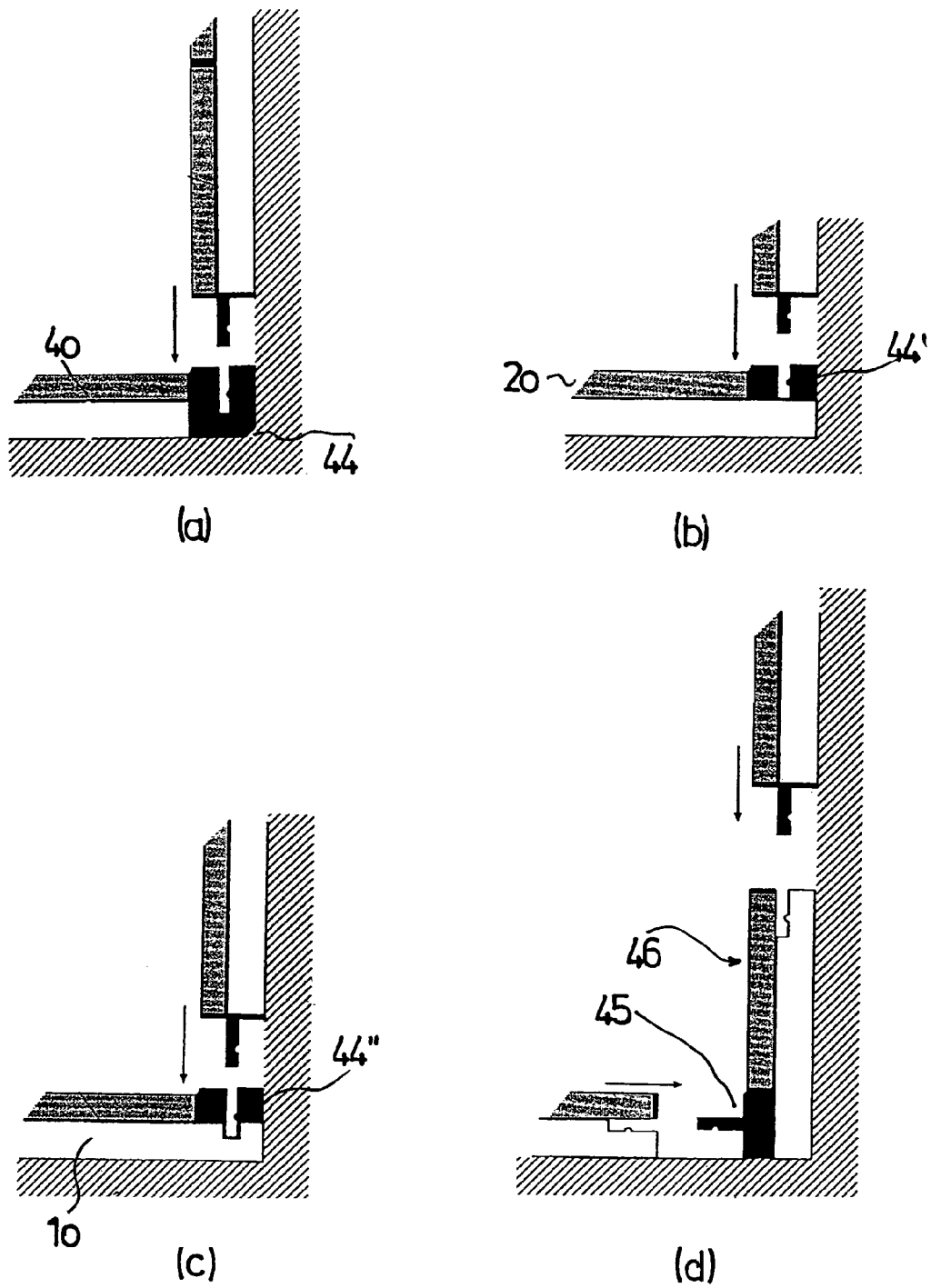
Figure 21:
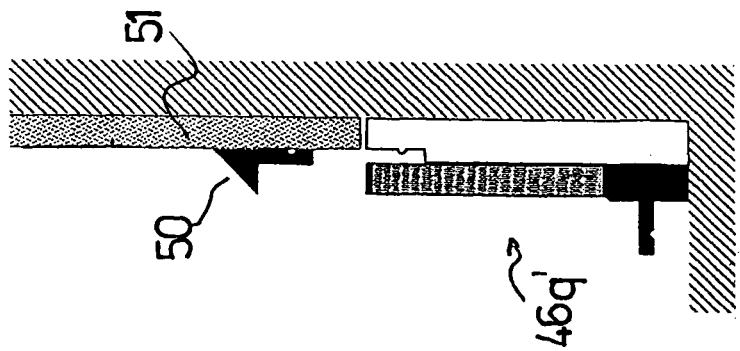
Figure 20:
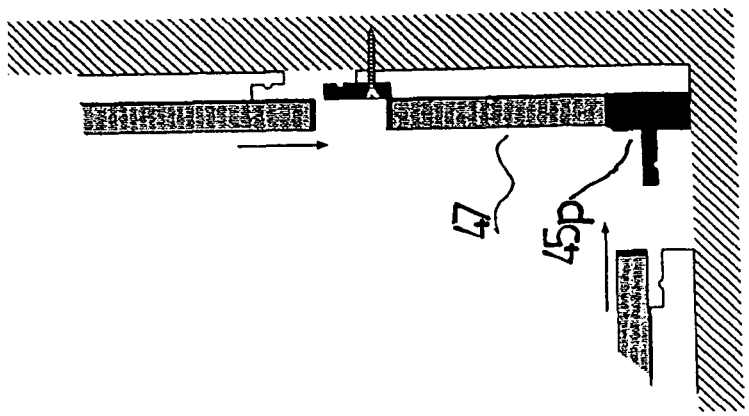
Figure 22:
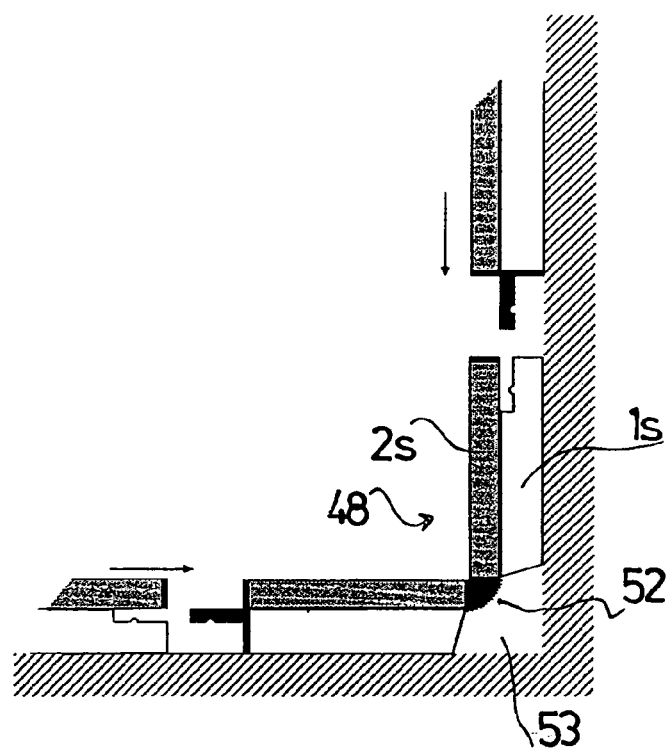
Figure 23:
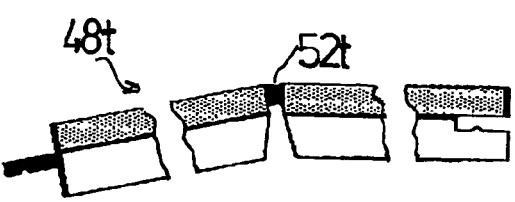
Figure 24:
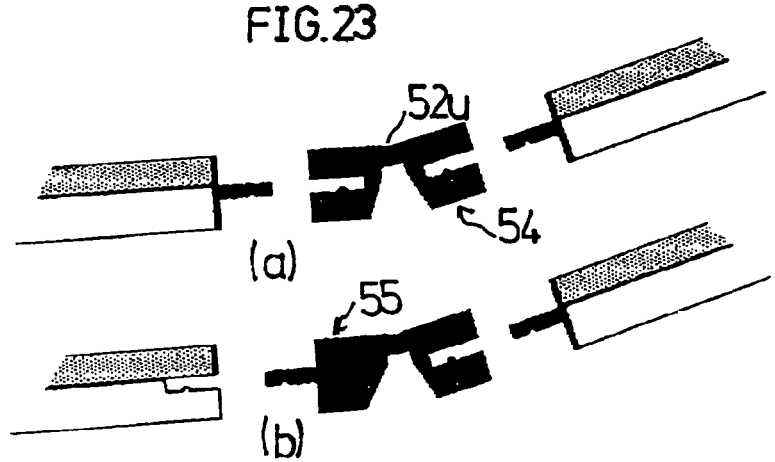
Figure 25:
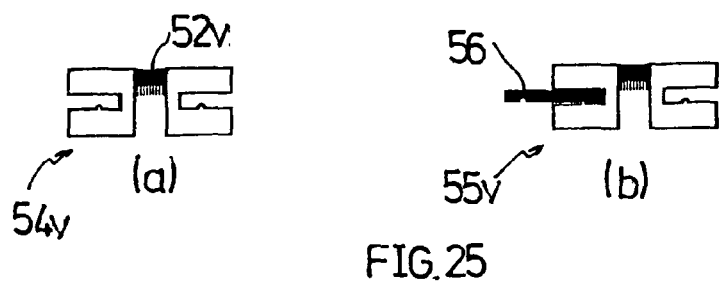
Figure 26:
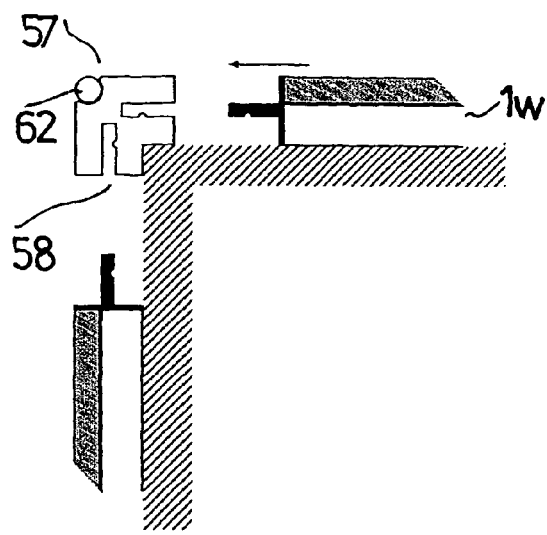
Figure 27:
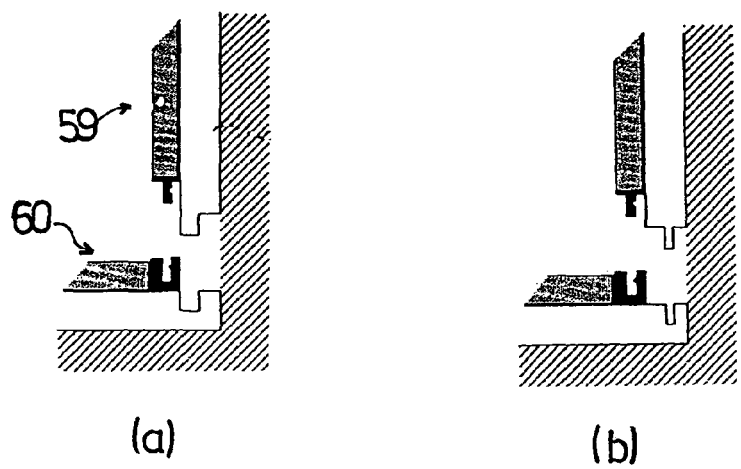
Figure 28:
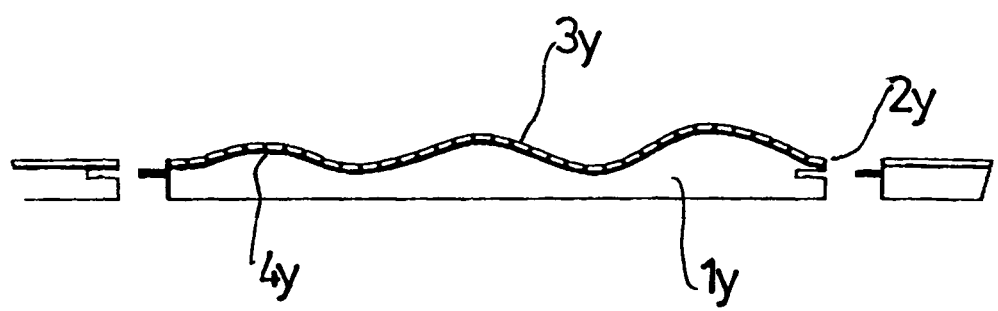

The invention is described in more detail based on the embodiments and the enclosed drawings relating to the embodiments as follows:

FIG. 1 is a top view of a building component comprising tiles according to the invention, FIG. 2 is a side view of the building component of FIG. 1, FIG. 3 shows a juncture between the building components according to FIG. 1, FIGS. 4 to 7 show connection devices of building components according to further embodiments of the invention, FIG. 8 is an embodiment for a building component according to the invention with a separate shoulder, onto which a connection tongue is formed, FIG. 9 shows further connection devices of building components according to further embodiments of the invention, FIG. 10 is a building component according to the invention with an embedded sensor, FIG. 11 is a building component according to the invention in which heating or cooling pipes are embedded, FIG. 12 is a building component according to the invention with a soft, ductile coating on its underside, FIG. 13 shows building components according to the invention with different surface profiles on the underside, FIG. 14 shows connection devices of building components according to further embodiments of the invention, FIG. 15 is an embodiment for the fastening of building components according to the invention to a sub-floor or a wall, FIGS. 16 and 17 are further embodiments for the fastening of building components according to the invention to a sub-floor, FIG. 18 is a juncture between a floor and wall covering, FIG. 19 shows further embodiments for junctures between a floor and wall covering or two wall coverings that come together in a corner, FIG. 20 is an embodiment for a connection of a floor covering with a wall covering and for a fastening of the wall covering, FIG. 21 shows embodiments for facing strips which cover the edge of a wall covering, FIGS. 22 and 23 show building components according to the invention with an elastic joint piece, FIG. 24 shows elastic joint connection elements which are insertable between the building components according to the invention, FIG. 25 shows further embodiments for elastic joint connection elements which are insertable between the building components according to the invention, FIG. 26 is an embodiment for a juncture between wall coverings at a protruding corner of a room, FIG. 27 shows further embodiments for junctures between a floor and wall covering, and FIG. 28 is a further embodiment for a building component according to the invention with a three-dimensional surface.

A building component for forming floor and/or wall coverings shown in FIG. 1 has a plate-shaped support layer 1 and a layer 2 connected with the support layer, which is comprised of nine tiles 3 in the respective embodiment. Coating elements made of all materials appropriate for wall and/or floor coverings are suitable in place of tiles.

The support layer 1 is connected with the layer 2 by means of an intermediate layer 4 made of PU foam. The intermediate layer 4 was foamed on the support layer and tiles in a tool cavity receiving the tiles 3 and the support layer 1. In the course of the foaming, the joints between the tiles were filled by means of foamed webs 5 and a bordering 6 encircling the layer 2 is formed, wherein the width of the bordering is half as wide as the width of the webs 5.

As can be further seen in FIGS. 1 to 3, tongues 7 are formed at the edges of the building components which are perpendicular relative to each other by means of edge graduations of the support layer 1. Grooves 8 result between the support layer and the layer 2 from reversed edge graduations at the respective, opposing edges of the support layer 1. In the place of continuous tongues, clips or socket pins and corresponding plug holders could be provided only over part of the length of the plate edge.

As can be seen in FIG. 3 a snap-in groove 9 extends along the tongues 7.

Correspondingly a snap-in web 10 is formed within the groove 8.

Tile floors can be made for example out of plate-like building components according to FIGS. 1 to 3, wherein the building components applied to the floor are connected together in a direction parallel to the plate plane, wherein the tongues 7 engage in the grooves 8 of neighboring components. A stable connection is achieved by means of the engaging of the snap-in webs 10 in the snap-in grooves 9 and a shifting of the building components relative to each other on the floor is thwarted.

The support layer 1 made of inexpensive plastic recycling material is stable and conveys a high firmness to the building component. The elastic and water-resistant PU foam reliably seals the joints between the tiles 3.

In the following figures identical parts or those with a similar effect are referred to with the same reference number as in the previous figures, wherein the letter a, b etc. is added to the respective reference number.

The embodiments of FIGS. 4*a* and 4*b* differ from the previously illustrated embodiment in that the edges of the support layer 1*a* or 1*a*' and a tile layer 2*a* or 2*a*' applied thereto in forming a console are arranged offset relative to each other in the direction of the plate plane. A high shearing stress of the tongue 7*a* or 7*a*' is avoided.

While the tongues were formed by edge recesses on the support layer in the previous embodiments, a tongue 7*b* or 7*b*' in the embodiments of FIGS. 5*a* and *b* is formed on an element 61 or 61' that is produced in one piece in a process step with an intermediate layer 4*b* or 4*b*'. A bordering 6*b* or 6*b*' from which the tongue protrudes, extends over the entire height of the building component. An element 11 also formed during the foaming or spraying of the intermediate layer 4*b*' forms a groove 8*b*'.

In the embodiment of FIG. 5*c* an element 12 which is similar to element 11 is formed that is adapted to an edge graduation of the support layer. This flexible embodiment which can be produced exactly to measure enables a particularly easy and problem free locking and effective sealing.

FIG. 6 shows different cross-sectional forms of tongues 7*c* and grooves 8*c* or of snap-in webs 10*c* and snap-in grooves 9*c*, wherein the embodiments of FIGS. 6*d* and *e* enable an interlocking which is particularly difficult to disconnect.

FIG. 7 shows embodiments with connection elements of a simplified design. The edges of a support layer 1*d* and a tile layer 2*d* applied thereto are arranged offset relative to each other in direction of the plate plane, so that the support layer and the tile layer overlap solely in the area of connection.

A snap-in web 13 or 13' formed on an intermediate layer 4*d* engages in a snap-in groove 14 or 14' on the support layer 1*d*. In the embodiment of FIG. 7*b* a snap-in web 15 is additionally formed on a bordering 6*d*, and a snap-in groove 16 is formed on the opposing sides of the tile layer 2*d*.

The embodiment of FIG. 7*c* shows a snap-in groove 17 and a snap-in web 18 arranged reversely at the corresponding places. A snap-in web 13" which is arranged directly at the edge of the tile layer 2*d* engages in the correspondingly arranged snap-in groove 14", wherein a further snap-in groove 20 is formed in the snap-in groove 14" for engaging a snap-in web 19 provided on the snap-in web 13".

As can be seen in FIG. 8 a tongue 7*e* can consist of for example a bar 21 separately made in a plastic continuous casting or drawing process or out of metal, which is connected by means of a base part 22 with a building component. The base part can be connected with the building component during the production of an intermediate layer 4*e* in a tool by spraying or foaming, as is indicated in 23. Holes formed in the bar 21 take in sprayed or foamed material and thus contribute to the firmness of the connection with the building component.

FIG. 9 shows building components with tongues 7*f* and grooves 8*f* which are provided on both sides with a snap-in web or a snap-in groove.

An element 24 that exhibits a snap-in groove 8*f'* is connected in one piece with an intermediate layer 4*f* in the embodiment of FIG. 9*b*.

As shown in FIG. 9*c*, a similar element 25 can also be produced as a separate part, for example out of plastic or metal and connected with the remaining building component for example by means of gluing, spraying or foaming.

FIG. 10 shows a building component in which a pressure sensor 26 is embedded between a support layer 1*g* and an intermediate layer 4*g*. Connecting lines, not shown in FIG. 10, which are routed to the sensor 26 can be foamed into the intermediate layer 4*g*.

FIG. 11 shows an embodiment for a building component with a support layer 1*h*, in which pipes 27 are embedded, through which a heating or cooling medium can flow. When mechanically connecting the building components, a pipe connection is effected by means of connection pieces 28. Pipes could also be embedded in a thickened intermediate layer or an additional layer arranged under the support plate, wherein the additional layer can be formed in a work process with an intermediate layer particularly by foaming or spraying on the support plate.

A building component with a support layer 1*i* is shown in FIG. 12, the underside of which has a soft, ductile coating 29. Such building components can advantageously adapt to an uneven sub-floor without floor pavement. The layer can also be made of a material or have a surface exhibiting a high static friction which counteracts shifting of the building components on the floor.

FIG. 13 shows building components with various floor profiles 30 to 32 on a support layer 1*j*. The floor profile can also have deep channels suitable for laying pipes.

While the previous embodiments for building components show snap-in grooves and snap-in webs which engage when displacing the building components parallel to the plate plane, two building components are shown in FIG. 14 in which a tongue-and-groove joint can be established by moving the building components perpendicularly to the plate plane.

FIG. 14 shows elements 33 and 34 or 33' and 34' which are connected in one piece with an intermediate layer 4*k* or 4*k'*, wherein a tongue 7*k* or 7*k'* is formed on the element 33 or 33' and a groove 8*k* or 8*k'* is formed on the element 34 or 34'.

An option for fastening the building components to a sub-floor 35 according to the invention can be seen in FIG. 15. The building component shown corresponds to the building component of FIG. 4*a* with the difference that a tongue 7*l*, which is formed by an element 36 connected in one piece with an intermediate layer 4*l*, fills an edge step at a support layer 1*l*. In the area of the edge step, the fastening to the sub-floor is formed by a screw 27. An opening for the screw 37 is conveniently prefabricated in the element 36.

FIGS. 16 and 17 show fastening elements 38 and 38' for fixing the building components horizontally on a sub-floor 35*m* by means of a screw 37*m*. Extensions 40 of a bordering 6*m* engage in a groove 39 of the element 38. In order to quickly replace building components, the connection can be easily released by lifting the building components. A groove and a tongue in the bordering 6*m* however prevent a loosening that is too easy.

A connection element 41 with a groove 42 and a tongue 43 can be seen in FIG. 18 which can be arranged in a corner between a floor and a wall. A tongue 7*n* of a building component applied to the wall can be inserted into the groove 42, while the tongue 43 of the connection element 41 engages in a groove 8*n* of a building component applied to the floor.

As can be seen in FIG. 19*a*, a connection element 44 which is similar to connection element 41 can also be foamed or sprayed directly on a separate building component intended for application in corners and in particular connected with an intermediate layer 4*o* in one piece, i.e., in one process step with the intermediate layer.

A connection element 44' can only extend over the depth of a tile layer 2*o* according to FIG. 19*b*.

According to FIG. 19*c*, a groove formed by means of a connection element 44" is extended into a base plate 1*o*.

FIG. 19*d* shows a connection piece 45 that is sprayed or foamed on a separate building component 46 which is intended as an end piece, and provided with a tongue.

The building component 46 as well as the separate building components according to FIGS. 19*a* to *c* are each connectable with a standard building component.

Figure 5:
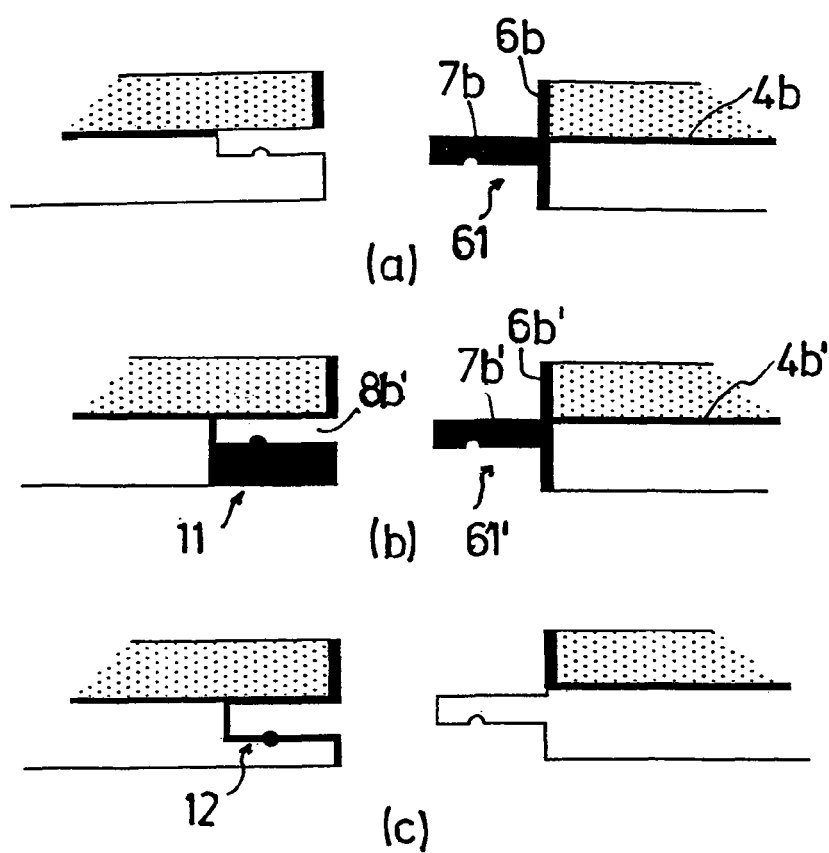

A fastening of a further special building component 47 which is intended as an end piece to a wall can be seen in FIG. 20, wherein this connection corresponds to the connection of a building component with a floor shown in FIG. 5.

FIG. 21 shows embodiments for edge facings 49 and 50 which are attachable by means of a tongue on the free edge of a building component 46*q* or 46*q'*. The edge facing 50 leaves room for a plaster or facing layer 51 which connects to the building component 46*q'*.

FIG. 22 shows a building component 48 that is provided for arrangement in a wall corner and has an elastic joint piece 52 which enables a bending of up to 90° and beyond. In the respective embodiment the joint piece 52 is inserted into a tile layer 2*s*, for example by spraying or foaming, while a support layer 1*s* which is connected with the tile layer is interrupted at 53.

FIG. 23 shows a building component 48*t* suitable for application to uneven floors with an elastic joint piece 52*t* which can be applied over floor edges, for example at the beginning or end of a ramp. It is conceivable to provide many such joint pieces and corresponding recesses 53*t* in a support layer. Recesses 53*t* can be milled at the factory or as necessary on location.

As can be seen in FIG. 24, joint connection pieces 54 and 55 can also be used for application over such floor edges, wherein the connection piece 55 which has both a tongue and a groove can be inserted at a possible juncture between the elements.

While the joint connection pieces 54 and 55 are made out of elastic material in one piece with a joint piece 52u, the joint connection pieces 54v and 55v shown in FIG. 25 are made of metal and exhibit only one elastic joint piece 52v which is glued, foamed or sprayed to the metal parts. The joint connection element 55v is provided with a plastic part 56 for forming a tongue.

FIG. 26 shows a connection element 57 which is provided for arrangement at a protruding corner of the room and comprises two grooves 58 facing each other at an angle of 90° and a corner protection element 62. The corner protection element 62 is made of stainless steel in the present embodiment and is fastened to the remaining connection element 57 by means of foaming or spraying.

Further embodiments for corner connections can be seen in FIG. 27 in which a building component 59 has a tongue each on both the support layer and the tile layer connected with the support layer, and a building component 60 has a groove on its base plate and on its tile layer.

Departing from the previously illustrated embodiments, the building element could be curved as a whole and serve for example as a covering for round columns.

Alternatively, only the surface could be curved. Such a building component with a three-dimensional surface can be seen in FIG. 28. A support layer 1y exhibits a three-dimensionally formed surface. A surface layer 2y comprising narrow coating elements 3y is connected by means of an intermediate layer 4y to the support layer 1y and adapted in shape to its surface. The narrow coating elements 3y can be connected with each other in a first production step by means of a foil or net. Such an arrangement can be fit into a molding cavity of a tool. The intermediate layer is then foamed on the mentioned foil or net by connecting the support layer 1y and the surface layer 2y.

The invention claimed is:

1. A building component for forming floor and/or wall coverings, comprising: a support layer for placement on a floor or a wall to be covered; an upper layer supported by the support layer and including at least one coating element forming a visible upper surface of the building component; an intermediate layer arranged between and connecting the support layer and the upper layer, the intermediate layer being thinner than the support layer and the upper layer; devices for connecting the building component to other such building components applied to the floor or a wall; and a bordering encircling an entire periphery of the building component and forming a visible filling at the visible upper surface of joints between coating elements of the upper layers of the building component and adjacent other such building components connected to the building component by said devices, wherein the bordering extends perpendicularly to the intermediate layer, wherein the intermediate layer and the bordering are one piece simultaneously formed in a molding cavity of a tool by foaming or spraying onto the support layer and the at least one coating element.

2. The building component according to claim 1, wherein the intermediate layer is foamed or sprayed by filling joints between several coating elements.

3. The building component according to claim 1, wherein the width of the bordering encircling the building component is half as wide as the width of joints between several coating elements.

4. The building component according to claim 1, wherein the intermediate layer is made of an elastic and/or water-resistant material.

5. The building component according to claim 1, wherein the support layer is made of recycling material.

6. The building component according to claim 1, wherein the coating element is made of ceramic, stoneware, natural stone, glass, plastic, metal and/or wood.

7. The building component according to claim 1, wherein the devices for connection of the building components are formed by elements that are molded together to the intermediate layer in one piece and/or the intermediate layer is foamed or sprayed on separate similar elements.

8. The building component according to claim 7, wherein the connection devices are engaging connector devices are provided.

9. The building component according to claim 7, wherein the edges of the support layer and of the upper layer encompassing the coating element are arranged offset relative to each other, parallel to the plane of the support layer.

10. The building component according to claim 1, wherein the devices for connecting are tongue-and-groove joints.

11. The building component according to claim 10, wherein the groove is formed between the support layer and the upper layer encompassing the coating element.

12. The building component according to claim 10, wherein an element having the tongue or groove is connected in one piece with the intermediate layer.

13. The building component according to claim 10, wherein the tongue-and-groove joints include a groove formed at two sides which are perpendicular relative to each other and a tongue formed at the sides opposing these sides.

14. The building component according to claim 1, wherein the support layer has a surface profile and/or a soft, ductile coating on its side facing away from the upper layer which is connected to the support layer.

15. The building component according to claim 1, wherein pipes for a heating and/or cooling, heating conductors and/or sensors are embedded in the support layer.

16. The building component according to claim 1, wherein the building component is part of a flexible building system which encompasses such building components.

17. The building component according to claim 16, wherein the devices for connecting include an elastic joint piece.

18. The building component according to claim 16, wherein the devices for connecting include elastic joint connection elements for the connection of building components as well as edge facing elements.

19. The building component according to claim 1, wherein the building component is curved as a whole and/or exhibits a curved surface.

20. The building component according to claim 1, wherein the coating element is formed as a plate.

* * * * *

UNITED STATES PATENT AND TRADEMARK OFFICE
CERTIFICATE OF CORRECTION

PATENT NO.      : 8,607,532 B2                              Page 1 of 1
APPLICATION NO. : 10/577083
DATED           : December 17, 2013
INVENTOR(S)     : Claus Permesang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1074 days.

Signed and Sealed this
Twenty-second Day of September, 2015

Michelle K. Lee
*Director of the United States Patent and Trademark Office*